United States Patent [19]
Vion

[11] Patent Number: 5,382,369
[45] Date of Patent: Jan. 17, 1995

[54] WASTE WATER-TREATMENT PROCESS

[75] Inventor: Patrick Vion, Houilles, France

[73] Assignee: Degremont, Rueil-Malmaison, France

[21] Appl. No.: 913,928

[22] Filed: Jul. 17, 1992

[30] Foreign Application Priority Data

Jul. 19, 1991 [FR] France ................. 91 09189

[51] Int. Cl.⁶ ............ B01D 21/08; C02F 1/52
[52] U.S. Cl. .................. 210/726; 210/727; 210/738; 210/702
[58] Field of Search ............ 210/726, 727, 738

[56] References Cited

U.S. PATENT DOCUMENTS

| | | |
|---|---|---|
| 2,217,143 | 10/1940 | Stevenson . |
| 3,707,464 | 12/1972 | Burns et al. . |
| 4,111,802 | 9/1978 | Louboutin ............ 210/713 |
| 4,388,195 | 6/1983 | von Hagel ............ 210/713 |
| 4,728,517 | 3/1988 | Markham et al. ....... 210/623 |
| 4,859,329 | 8/1989 | Fink ................. 210/257.1 |
| 5,021,153 | 6/1991 | Haws ................. 210/521 |
| 5,076,937 | 12/1991 | Montgomery .......... 210/738 |
| 5,143,625 | 9/1992 | Ballard .............. 210/727 |

FOREIGN PATENT DOCUMENTS

290030 11/1988 European Pat. Off. .
2448939 9/1980 France .

OTHER PUBLICATIONS

Lash, et al., "Primary-Waste-Treatment Methods," *Chemical Engineering*, vol. 82, No. 21, Oct. 6, 1975, p. 49.

*Primary Examiner*—Wilbur Bascomb, Jr.
*Attorney, Agent, or Firm*—Pollock, Vande Sande & Priddy

[57] ABSTRACT

A water-treatment process which simultaneously performs degritting, degreasing, coagulation, flocculation and settling. The steps include breaking down into two elementary steps, at least least one of the degritting and degreasing functions and, simultaneously performing at least one of the following associated steps:
- coarse degritting and coagulation of untreated water;
- fine degritting and a first step for coalescence of grease particles, and high-energy flocculation;
- a second step for coalescence of the grease particles and low-energy flocculation, and
- separating the greast particles and commencing a settling operation.

4 Claims, 4 Drawing Sheets

WASTE WATER-TREATMENT PROCESS

FIELD OF THE INVENTION

The present invention relates to improvements made in water treatment and it aims more particularly to provide a process and devices for implementing such a process enabling degritting, degreasing, coagulation, flocculation and settling of the water to be performed simultaneously.

Background of the Invention

It is known that in existing water-treatment techniques the degritting and degreasing functions are performed in different apparatuses and the clarifying function comprising the three successive steps: coagulation, flocculation and settling, is performed in one or more apparatus. However, in order to profit in terms of investment and in terms of compactness a, plant has been designed which groups together into a single construction the degritting and degreasing functions. Unfortunately, these two functions do not require the same operating conditions. In fact:

degritting requires a great consumption of energy in order to carry out the stripping of the grit (that is to say the operation which consists in separating the organic matter therefrom) before its discharge; and a small surface area for settling which ensures a settling velocity such that the organic matter does not settle with the grit;

the degreasing requires calm zones of high surface area for separation, optionally with the presence of generators of fine air bubbles (dissipating a low energy content in the medium) in order to accelerate the process.

It follows from these contradictory requirements that the combined apparatuses produced currently, which do not separate the various functions, still give poor performance.

The two pretreatments mentioned hereinabove are generally followed by a mechanical-chemical treatment (coagulation and flocculation) and by a settling operation, or by a single settling operation, called primary settling, ahead of the biological treatments.

BRIEF DESCRIPTION OF THE INVENTION

The present invention therefore, proposes to reduce the size of the plant while optimizing the two functions of degritting and degreasing.

The starting principle forming the basis of the process, which forms the subject of the present invention, comprising:

breaking down at least one of the operations of degritting and of degreasing into elementary steps which enable these two functions to be optimized;

combining at least one of these two steps with the elementary steps which are carried out during the mechanical-chemical treatments, and the settling, this combination being made possible because of the compatibility between the characteristic parameters of the steps of the various functions (energy, retention time, apparent speed and flow directions).

The degritting and degreasing functions can be broken down into elementary steps as follows:

for degritting:

a stripping phase during which the grit particles of large particle size which are freed of organic matter must be recovered (permitting possible disposal of the discharged grit), this phase requiring a high energy content (15 to 50 W/m³) and it is generally performed with large air bubbles in a small volume with a retention time of the order of 3 to 5 minutes.

a phase for separating the finest grit particles (generally having a particle size less than 250 μm), these grit particles remaining mixed with organic matter, some of which has equivalent settling velocity.

for degreasing:

a phase during which coalescence of the grease particles is performed, this step being carried out with an inflow of energy and, optionally, improved by the addition of quite fine air bubbles.

a second, low energy phase for coalescing the grease particles, optionally employing an injection of very fine air bubbles (having a diameter less than 1 mm) which enables the gravity separation to be improved.

a separation phase which has to be performed in a zone which is calm and sufficiently large for the flow rate per m² of separation surface area to be between 5 m³/h/m² and 20 m³/h/m². This separation is promoted by a low-velocity vertical-flow feed.

Moreover, it is known that the elementary steps which are carried out in a mechanical-chemical water-treatment operation are the following:

coagulation:

during this step, a coagulant, such as an iron or aluminum salt, is injected upstream of a reactor in which the retention time is between one and four minutes and where an energy content of between 20 and 60 W/m³ is dissipated;

first-stage flocculation:

during this step, a flocculant, formed from a polymer, is dissipated in a stirred reactor (5 to 20 W/m³). The retention time in this reactor is between 5 min and 30 min;

second-stage flocculation:

this step consists of a low-energy flocculation with a shorter retention time. Preferably, the configuration of the equipment enabling this function to be carried out consists of an upflow piston reactor.

This mechanical-chemical treatment is followed by the settling operation comprising:

feeding of the settling zone, performed with low-velocity downflow. This feed is integrated into the settling tank in which the next step of the stage resulting from the actual settling is performed, during which the flocculated matter and the grease particles trapped in the floc are removed.

Consequently, this invention relates firstly to a water-treatment process which consists in performing simultaneously degritting, degreasing, coagulation, flocculation and settling, characterized by the steps:

in breaking down into two elementary steps, at least one of the degritting and degreasing functions and, simultaneously performing at least one of the following associated steps:

coarse degritting and coagulation of the untreated water;

fine degritting and a first step for coalescence of grease particles, and high-energy flocculation;

a second step for coalescence of the grease particles and low-energy flocculation, and separating the grease particles and commencing a settling operation.

Secondly, the invention also relates to any device enabling the process specified hereinabove to be implemented.

Such a device is characterized in that it includes:

a reactor having a high specific energy content, using mechanical stirring or injection of air, in which, on the one hand, grit is stripped in the residual water to be treated in order to remove the largest grit particles free of organic matter and, on the other hand, coagulation is performed by mixing the coagulant with untreated water;

a stirred reactor having a longer retention time in which the finest grit particles are removed, possibly with organic matter, the grease particles coalesce, optionally with an inflow of air bubbles, and flocculation is performed by adding a flocculant and by dissipating the energy uniformly throughout the reactor by means of mechanical stirring and/or injection of air;

a reactor in which growth of the floc and the start of the separation of the grease particles are performed, this reactor being preferably a low-velocity upflow piston reactor into which fine air bubbles may be injected in order to accelerate the rate of rise of the grease particles, the size of the bubbles having to be as small as possible in order not to break up the flocs and to promote the binding of the grease particles by virtue of surface-tension phenomena.

a feed zone for the settling operation in which separation of the grease particles is performed, this zone being equipped at its outlet with a system for picking up or transferring the floating particles, and a settling tank.

The invention will now be described in detail by referring to the attached drawings which illustrate various examples of it implementation, it being understood that all these examples are free of any limiting character. In the drawings:

DETAILED DESCRIPTION OF THE INVENTION

Figure 1:
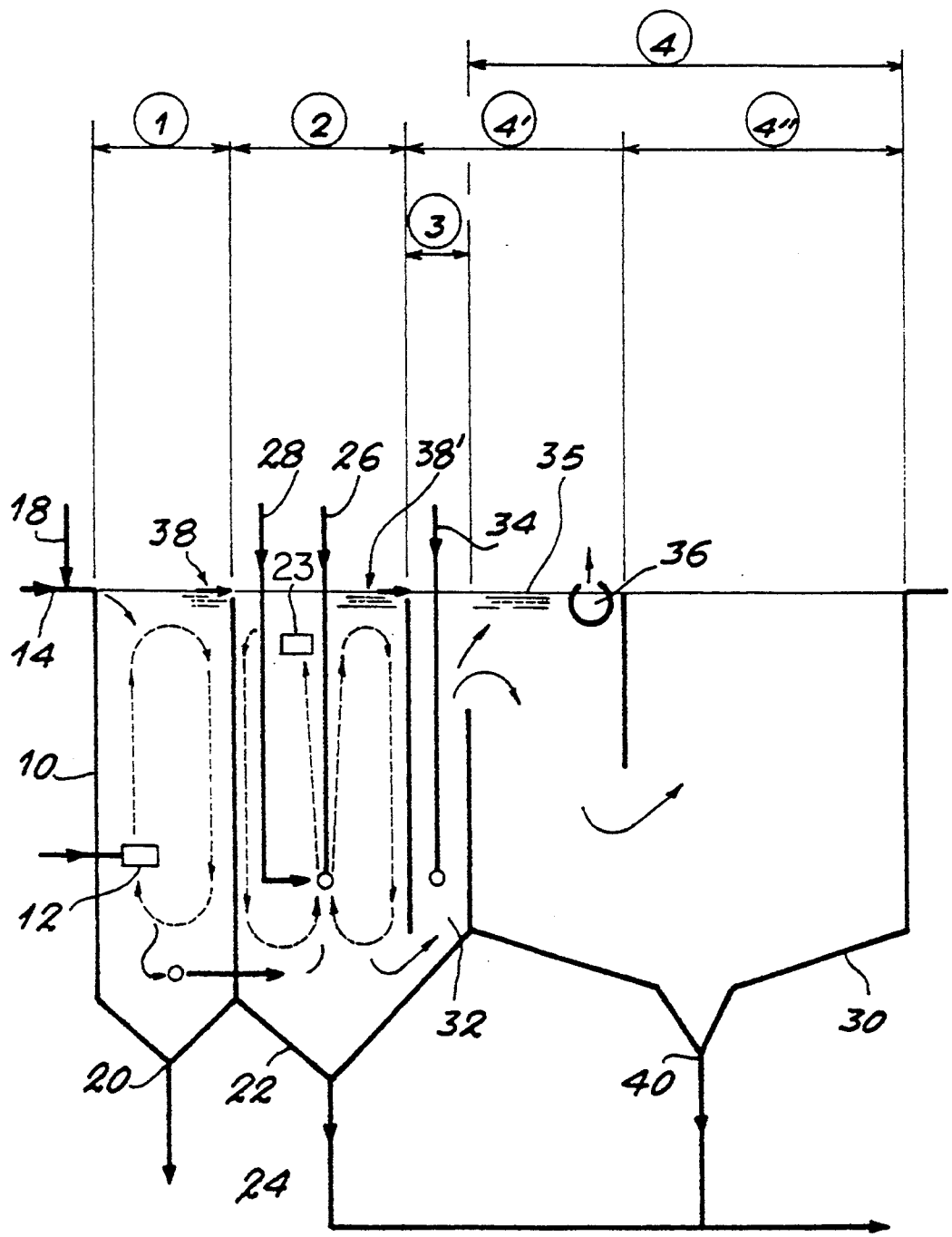
FIG. 1 shows diagrammatically, in vertical axial cross-section, a plant enabling the process, which forms the subject of the invention, to be implemented.
Figure 2:
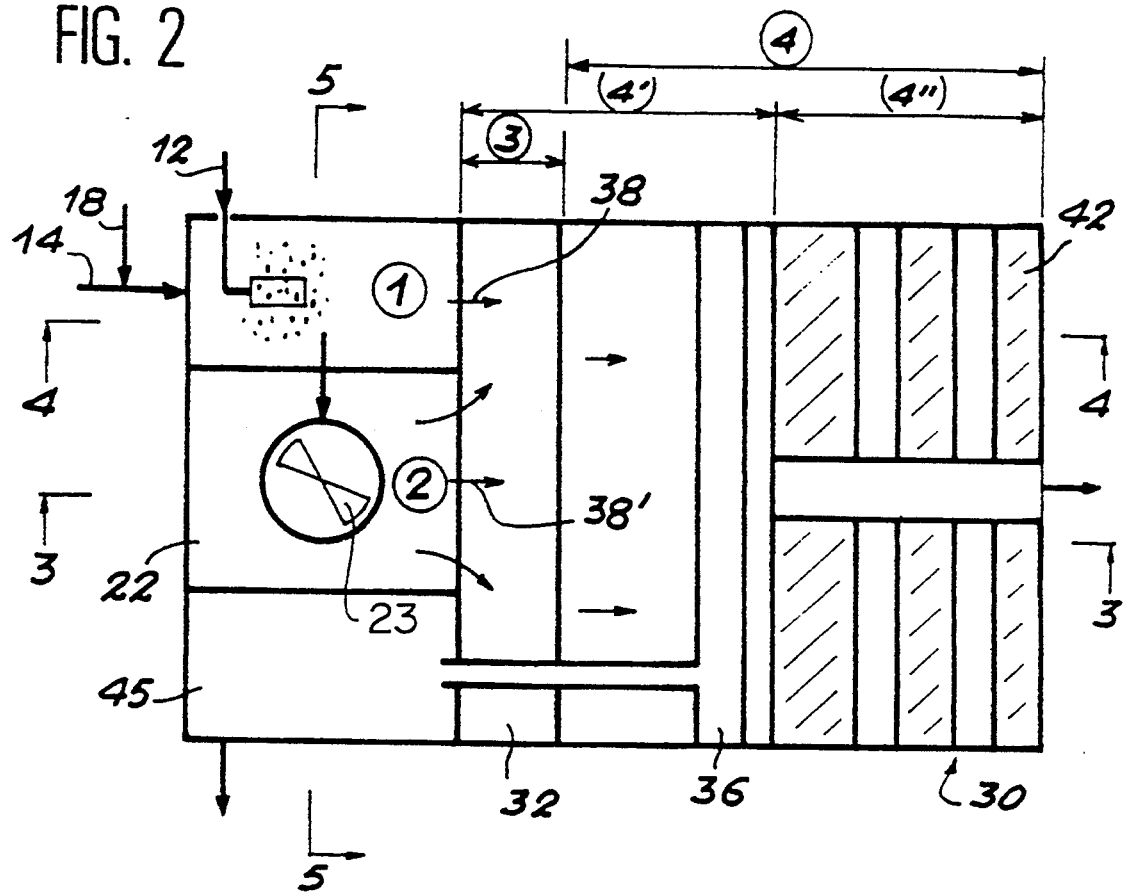
FIG. 2 illustrates a variant of the plant according to the invention employing a laminar settling tank.
Figure 3:
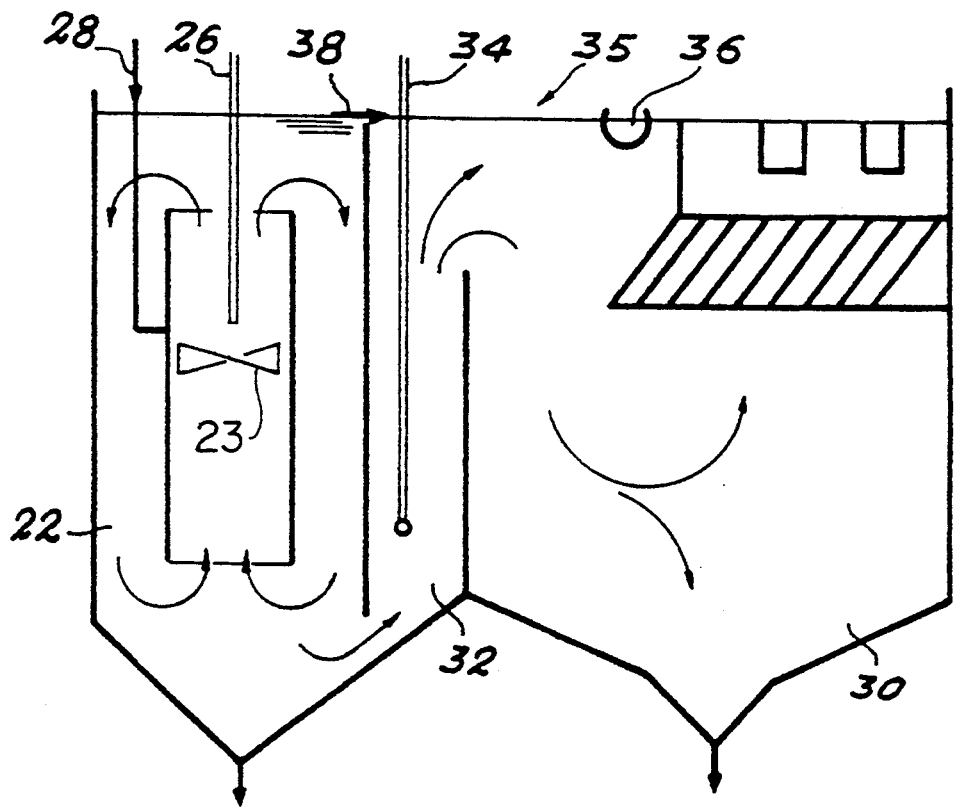
FIGS. 3 and 4 are respectively cross-sections along 3—3 and 4—4 of FIG. 2.
Figure 4:
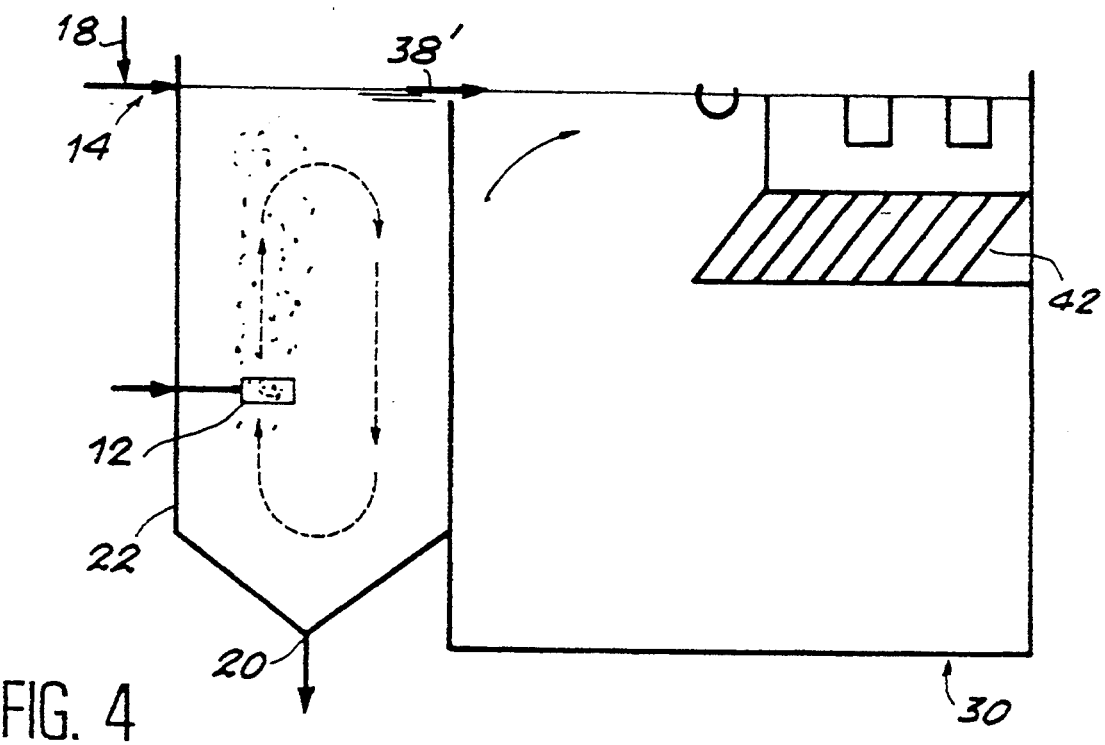
Figure 5:
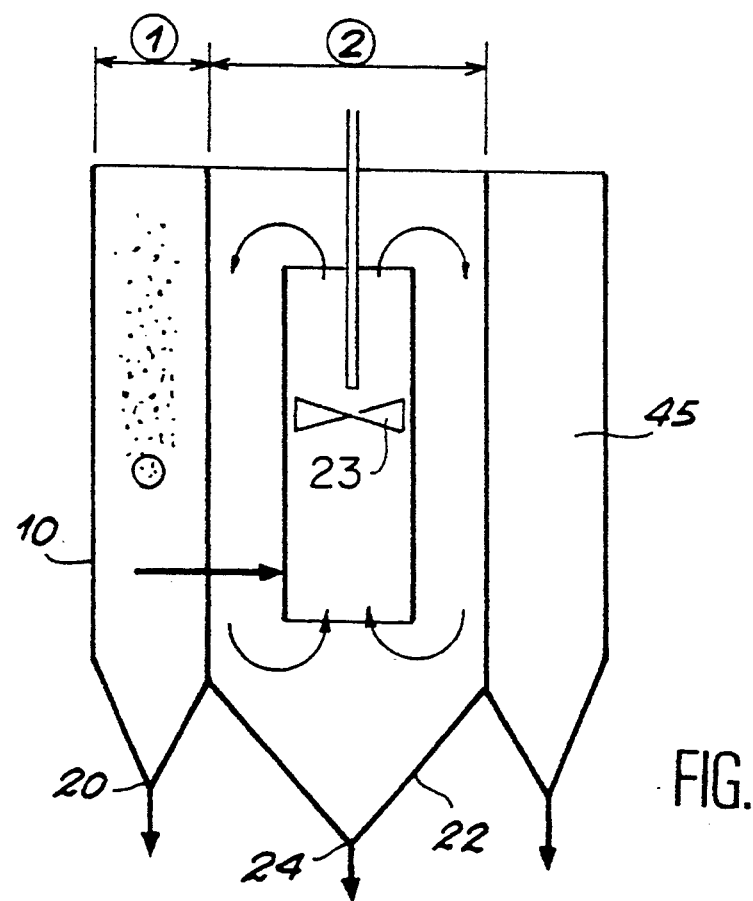
FIG. 5 is a sectional view along 5—5 of FIG. 2.

Reference is firstly made to FIG. 1 which show, in a general manner, a device for the implementation of the process according to the present invention. Shown diagrammatically in the upper portion of this figure are the various steps of the process according to the invention, such as have been indicated hereinabove, these steps corresponding, as will be seen hereinafter, to a portion of the device shown in this figure. These steps, as has already been indicated, are the following:

step 1: coagulation during which a coagulant is injected and simultaneously the stripping of the grit in the water to be treated is achieved. The device includes for this purpose a reactor 10 having a high specific energy content and including a system 12 of mechanical stirring or of injection of air within the raw mass to be treated which is introduced at 14 into the reactor. This system 12 enables the mixing of the coagulant 18 and consequently the coagulation to be achieved. The largest grit particles, free of organic matter, are removed via the lower portion 20 of the reactor 10.

step 2: removal of the finest grit particles, coalescence of the grease particles and flocculation are carried out therein. This step is performed in a reactor 22, subjected to stirring (23), with a long retention time so as to permit the deposition and the removal at the base 24 of the reactor 22 of the finer grit particles, possibly with organic matter which may be treated subsequently with the sludge extracted from the settling tank 30 described hereinbelow. Simultaneously, coalescence of the grease particles is promoted in this reactor 22, optionally with an inflow of air bubbles via a suitable means 26, and flocculation by adding, in a known manner, a flocculant 28, for example a polymer, and by dissipating the energy uniformly throughout the reactor by mechanical stirring (23) or by injection of air.

step 3: growth of the floc is carried out therein and the separation of the grease particles is started therein. In this embodiment, a low-velocity upflow piston reactor 32 is employed. In order to accelerate the rate of rise of the grease particles, it is possible to inject fine air bubbles 34. As has already been indicated in the preamble of the description, the size of these air bubbles must be as small as possible so as not to break up the flocs and to promote the binding of the grease particles by virtue of surface-tension phenomena.

step 4: downflow feeding 35 for the settling zone and the settling operation (step 4″) are carried out in succession therein. A settling tank 30 is implemented therein. The surface 4′, delimited by this zone and by the preceding zone including the piston reactor 32 permits separation of the grease particles. At its outlet, this feed zone 35 includes a mechanical system 36 for taking up the floating particles. Given that grease particles may appear on top of the reactors 10 and 22, a system for taking up or for transferring the floating particles 38-38′ is provided. The settling during step 4″ is performed with the aid of any high-performance settling-tank system equipped, for example, with laminar modules. The sludge is removed at 40 at the base of the settling tank 30 and it can then be treated at the same time as the grit particles extracted from the reactor 22.

The process according to the invention may be applied in an entirely suitable fashion to the apparatus for treating water by precipitation, separation and sludge thickening, including a laminar sludge-recirculating settling tank, of the type described in French Patent No. 83/15977 in the name of the present proprietor, which patent is published under the U.S. Pat. No. 2,553,082, to which it will be useful to refer.

A plant employing such a settling tank is illustrated by FIGS. 2 to 5. The various steps described hereinabove with respect to FIG. 1 are encountered there again, as well as the references used in that figure:

step 1 (coagulator)
retention time: 3 minutes
apparent velocity: 70 m³/h/m² (diameter of the retained grit greater than 200 μm)
energy (air): 40 W/m³
step 2 (rapid flocculation)
jacketed screw: 10 to 20 W/m³
apparent velocity: 30 m³/h/m² (diameter of the retained grit greater than or equal to 100 μm)
step 3 (slow flocculation)
This step is performed as previously in a low-energy upflow piston reactor 32.
step 4 (as described hereinabove, this step includes feeding 35 the settling tank 30 and the actual settling phase 4"):
the operation in zone 4' works with downflow with a separation surface area constituted, as previously, by the surface areas of the piston reactor 32 and of the feed zone 35. The apparent velocity is of the order of 15 m/h.
in the settling step 4", laminar settling tanks 42, as described in the patent mentioned hereinabove, are employed:
velocity in the laminar modules: 20 to 25 m/h
yield for the removal of the suspended matter: 80 to 95%.

It will be noticed that this device, in accordance with the invention, permits integration of all the functions in its confines and in its initial configuration. The configuration of the device permits the direct transfer of the grease particles from the zones corresponding to steps 1 and 2 to the zone of step 3 where the plant for recovering the floating particles is placed. It will be noted that this device permits integration of a vessel 45 permitting the storage of the grease particles, which confers on the device a particularly advantageous compactness.

Figure 6:
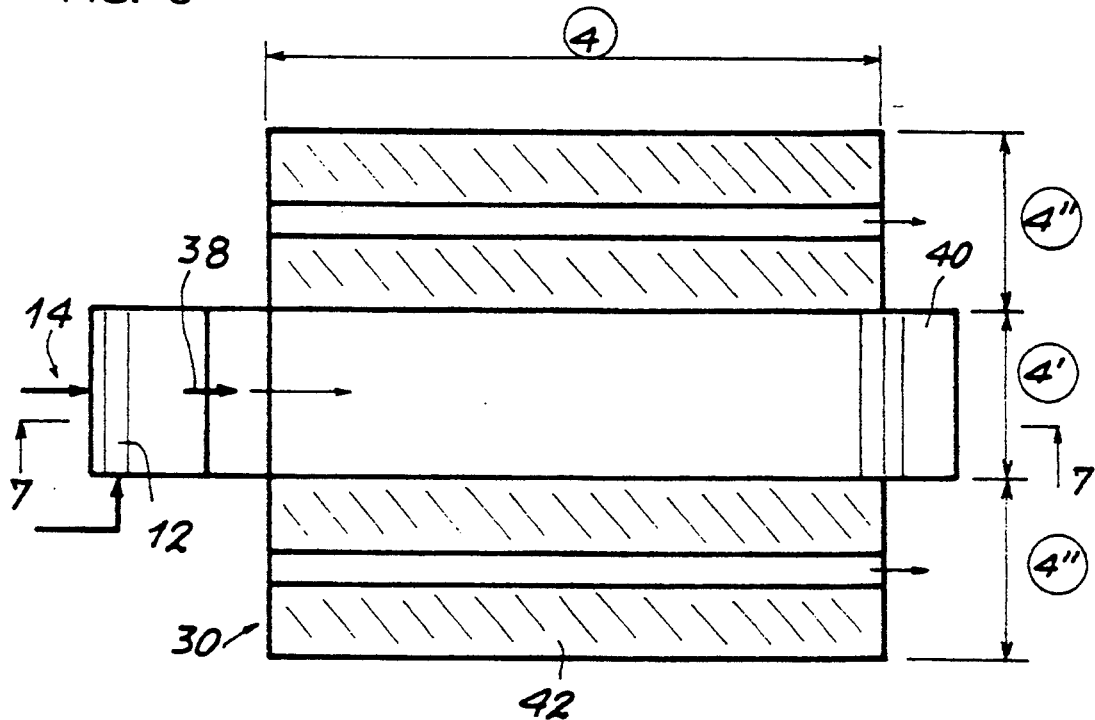
FIG. 6 illustrates another variant of an apparatus for implementing the invention, also including a laminar settling tank, this figure being a plan view.
Figure 7:
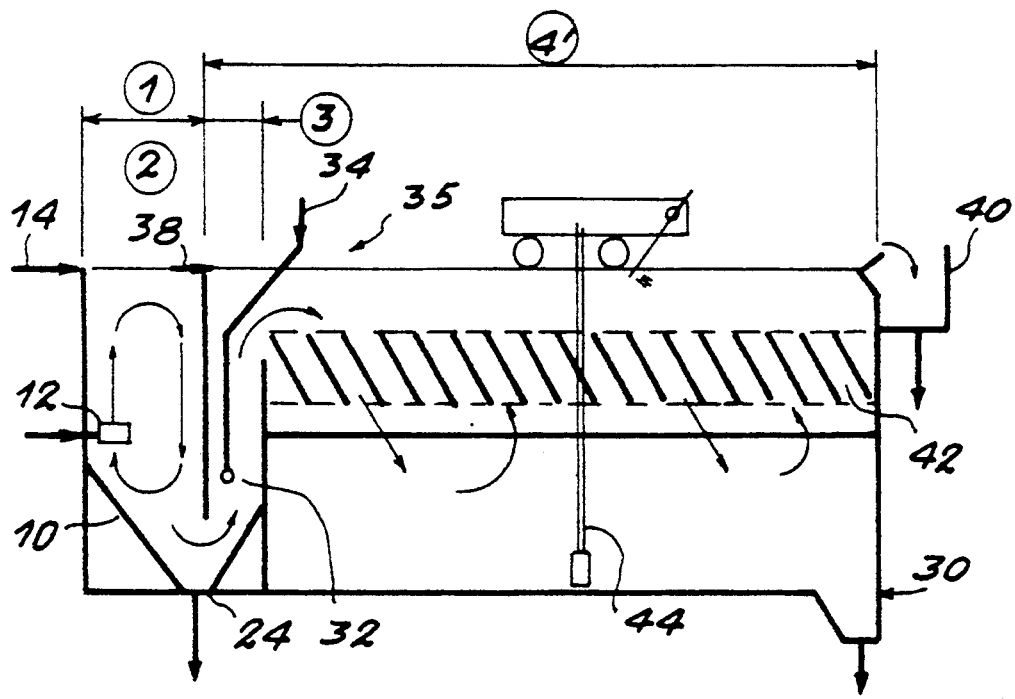
FIG. 7 is a view along 7—7 of FIG. 6.

The present invention may also be applied, at least partially, by employing a primary laminar settling tank as shown in FIGS. 6 and 7. In this embodiment, there is no flocculation integrated into the settling tank (steps 1-2 and 3) and only the separating step of the degreasing may be superposed on the feed step of the settling tank. In the case of the use of a laminar settling tank, the hydraulic distribution of the settling tank may advantageously be of the downstream type, that is to say with partitioning from above, as described in French Patent No. 86/06638 filed by the present proprietor and published under the U.S. Pat. No. 2,598,331. By virtue of this device, it is possible to delimit an open feed zone without a system of distribution by trough.

In FIGS. 6 and 7, the various steps according to the present invention are encountered again together with the reactors described hereinabove permitting their implementation, especially the degritting reactor 10 with the coalescence zone 2 and the piston reactor 32 preceding the feed zone 35 for the upflow settling tank.

In this variant, the device 44, for scraping the bottom of the laminar settling tank 30, also serves to push the floating particles towards the outlet 40.

It remains the case, of course, that the present invention is not limited to the examples of implementation or of embodiment described here, but that it encompasses all variants. Thus, the invention especially encompasses also the process in which not the two, degritting and degreasing, functions are performed but only one of them.

The present invention also encompasses the case where a filter is used instead and in place of a settling tank.

I claim:

1. A waste water treatment process comprising the steps:
    introducing a coagulant into a first volume of raw waste water;
    stirring the first volume of raw waste water to ensure coagulation simultaneous with separation of coarse grit, from the waste water;
    removing the coarse grit from the first volume;
    transferring water from the first volume to a second volume while ensuring flow from the surface layer of the first volume, containing floating particles, to the surface layer of the second volume;
    admixing a flocculant to the water in the second volume;
    stirring the second volume of water to achieve flocculation simultaneous with both coalescence of grease particles and separation of fine grit;
    removing the fine grit from the second volume;
    transferring water from the second volume to a third volume while ensuring flow from a surface layer of the second volume, containing floating particles, to the surface layer of the third volume;
    introducing air bubbles into the third volume, sufficiently small for accelerating the rate of grease particle rise and binding of the particles, without breaking apart floc growing in the third volume;
    transferring water from the third volume to a calm fourth volume while ensuring flow from a surface layer of the third volume, containing floating particles, to the surface layer of the fourth volume;
    allowing the transferred water of the fourth volume to settle;
    skimming the floating particles of the fourth volume, primarily grease particles;
    removing skimmed grease particles from the fourth volume; and
    removing a lower portion of water settled in the fourth volume, which is sludge.

2. The method as described in claim 1 further comprising, simultaneous with stirring in the second volume, the step of introducing air bubbles into the second volume to improve coalescence and separation of grit particles.

3. The method as described in claim 1 further comprising the step of laminar settling of the fourth volume.

4. The method as described in claim 1 further comprising the step of filtration of the fourth volume.

* * * * *